US006515691B2

(12) United States Patent
Kerr

(10) Patent No.: US 6,515,691 B2
(45) Date of Patent: Feb. 4, 2003

(54) LEAD SCREW AND WRITE ENGINE USING SAME

(75) Inventor: Roger S. Kerr, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/891,480

(22) Filed: Jun. 26, 2001

(65) Prior Publication Data

US 2003/0007022 A1 Jan. 9, 2003

(51) Int. Cl.[7] .............................. B41J 2/47; B41J 2/435; G01D 15/16; G01D 15/18

(52) U.S. Cl. .................................... 346/139 D; 347/234

(58) Field of Search .......................... 400/59, 320, 322; 347/37, 8, 232, 234; 346/139 D

(56) References Cited

U.S. PATENT DOCUMENTS 4,050,568 A * 9/1977 Davies et al. ........... 346/139 D
4,698,798 A * 10/1987 Faber et al. ................ 318/481
5,268,708 A 12/1993 Harshbarger et al. ....... 346/134
5,771,059 A 6/1998 Kerr et al. .............. 346/139 D

* cited by examiner

*Primary Examiner*—John Barlow
*Assistant Examiner*—Julian D. Huffman
(74) *Attorney, Agent, or Firm*—Nelson Adrian Blish

(57) ABSTRACT

A lead screw assembly (251) for preventing axial movement of a lead screw (250) within a write engine system (200) includes a threaded shaft (252) having a ball end (263) and a first member attached to the ball end (263). A second member is arranged to be magnetically attracted to the first member and spaced apart from the first member so as to prevent mechanical friction between the first and second members. The first and second members prevent substantial axial movement of the threaded shaft (252) while it rotates. The first member may comprise a magnet insertably attached to the ball end (263) such that the ball end (263) is annularly surrounded by the first member. An end cap (268) may be attached to provide an axial-stop for the lead screw (250).

15 Claims, 4 Drawing Sheets

LEAD SCREW AND WRITE ENGINE USING SAME

FIELD OF THE INVENTION

The invention relates to image processors in general and in particular to image processors utilizing a rotating lead screw for moving a printhead. More particularly, the invention relates to an improvement in the performance, quality and cost of such a lead screw assembly. Still more particularly, the invention relates to an improved lead screw assembly that substantially minimizes shifting or movement.

BACKGROUND OF THE INVENTION

Pre-press color proofing is a procedure long used by the printing industry for creating representative images of printed materials in an effort to lessen the high cost and time required to produce printing plates and to set up a high-speed, high volume, printing presses.

One such commercially available image processor, as depicted in U.S. Pat. No. 5,268,708, includes half-tone capabilities. Such printing systems are able to form an image on a sheet of thermal print media (TPM) in which dye from a sheet of donor material is transferred to the TPM by applying an adequate amount of thermal energy to the dye material. Generally, the processor is comprised of a material supply carousel and a lathe bed engine writing system. The write engine itself includes an engine frame, translation drive, translation stage member, write-head, image drum and exit port for the TPM and the dye donor sheets.

In operation, sheets of TPM and dye donor material are transported from the materials carousel and peripherally wrapped around the imaging drum. Once secured, a print engine provides the printing function by exposing the TPM and dye donor material while it rotated past the printhead by means of the rotating imaging drum. The translation drive then traverses the printhead is fixed onto a translation member, axially along the axis of the image drum and in a coordinated motion with the spinning drum. Inevitably, these movements combine to produce the intended image on the thermal print media. The processor repeats these step over again but with different colored dye donor sheets in order to produce the desired image. Once complete, both the TPM and the dye donor sheets are removed from the image drum and transported to their respective external holding trays.

To allow for movement of the printhead along the imaging drum, the translation stage with the printhead mounted thereon may be coupled to a lead screw nut which in turn is attached to a lead screw having a threaded shaft. An example of such a lead screw assembly is described and disclosed in U.S. Pat. No. 5,771,059, the entirety of which is incorporated herein by reference. The lead screw rests between the two sides of the write engine frame and is supported by a ball and bearing socket and a radial bearing at the drive end. The drive end of the lead screw continues through the radial bearing and is connected to the drive motor that provides rotation of the lead screw.

A problem associated with such lead screw assemblies is the tolerance between the lead screw and the bearing socket in which it fits. An increased tolerance between the end of the lead screw, which is usually a ball, and the mounting socket could result in the ball releasing from the mounting socket. Alternatively, the epoxy holding the ball in the mounting socket, if assembled improperly, can stick on the ball causing interference with the bearing pocket. This may lead to unwanted axial lateral shifting or movement of the lead screw assembly resulting in an image defect. Other problems include improper seating within the mounting socket or loss of the bond holding the lead screw within the mounting socket.

Accordingly, a need exists for an improved lead screw assembly that eliminates the problems associated with shifting or movement of the lead screw.

SUMMARY OF THE INVENTION

It is the object of the present invention to provide an improved lead screw assembly.

Another object of the present invention is to provide a ball end lead screw assembly that overcomes one or more of the problems set forth above.

Still another object of the present invention is to provide a lead screw assembly that eliminates shifting or movement of the lead screw within the write engine.

As such, disclosed in one embodiment is an improved lead screw assembly. The lead screw assembly comprises a threaded shaft having a ball end and a first member attached to the ball end. A second member is arranged to be magnetically attracted to the first member and spaced apart from the first member so as to prevent mechanical friction between the first and second members. The first and second members prevent substantial axial movement, shatter, or vibration of the threaded shaft while it rotates.

The lead screw assembly may further comprise a write engine frame adapted for housing the threaded shaft such that the shaft is firmly secured as it rotates. A motor is mounted on the engine frame, the motor having an output shaft attached to the opposite end of the threaded shaft and adapted for rotating the threaded shaft.

The first member may comprise a magnet mounted and attached to the ball end such that the ball end is annularly surrounded by the first member. Also, an end cap may be attached to the frame such that the cap provides an axial-stop for the lead screw. In one embodiment, the end cap comprises a circular flat surface and a shaped circular surface opposite the flat surface such that the shaped circular surface is adapted for receiving the ball end of the shaft and eliminate axial movement the shaft as it rotates.

Further disclosed is a print engine system having an improved lead screw assembly for improving an image generating process. The system comprises a print head and a lead screw nut coupled to the print head by means of a translation stage. A threaded shaft is insertably coupled to the lead screw nut and adapted to cause the lead screw nut to move the print head mounted on the translation stage axially along the threaded shaft. The print head is substantially stabilized as the nut moves axially along the shaft while the print head generates an image.

The system may also comprises a write engine frame adapted for housing the threaded shaft such that the shaft is firmly secured as it rotates. If so configured, a motor is provide and is mounted on the engine frame, the motor having an output shaft attached to the opposite end of the threaded shaft. The motor is adapted for rotating the threaded shaft.

The threaded shaft may further comprise a ball end and a first member mounted to and attached to the ball end. A second member is magnetically attracted to the first member and spaced apart from the first member so as to prevent mechanical friction between the first and second members while the shaft rotates.

According to one embodiment, the second member may further comprise an end cap attached to the write engine frame for providing an axial stop for the thread shaft. The end cap may further comprise a circular flat surface and a shaped circular surface opposite the flat surface. The shaped surface is adapted for receiving the ball end of the shaft so as to substantially diminish the axial movement of the shaft as it rotates.

The invention can be used in any image processing apparatus that uses thermal print media and dye donor materials or other similar materials using colorant.

An advantage of the present invention is that it simplifies the manufacture the lead screw assembly.

Another advantage of the present invention that it provides a better quality lead screw assembly.

Still another advantage of the present invention that it provides a lower cost lead screw assembly.

Although not described in detail, it would be obvious to someone skilled in the art that this invention could be used in other imaging applications where a lead screw is used for printhead positioning.

References in the detailed description correspond to like references in the figures unless otherwise indicated.

DETAILED DESCRIPTION OF THE INVENTION

Figure 1:
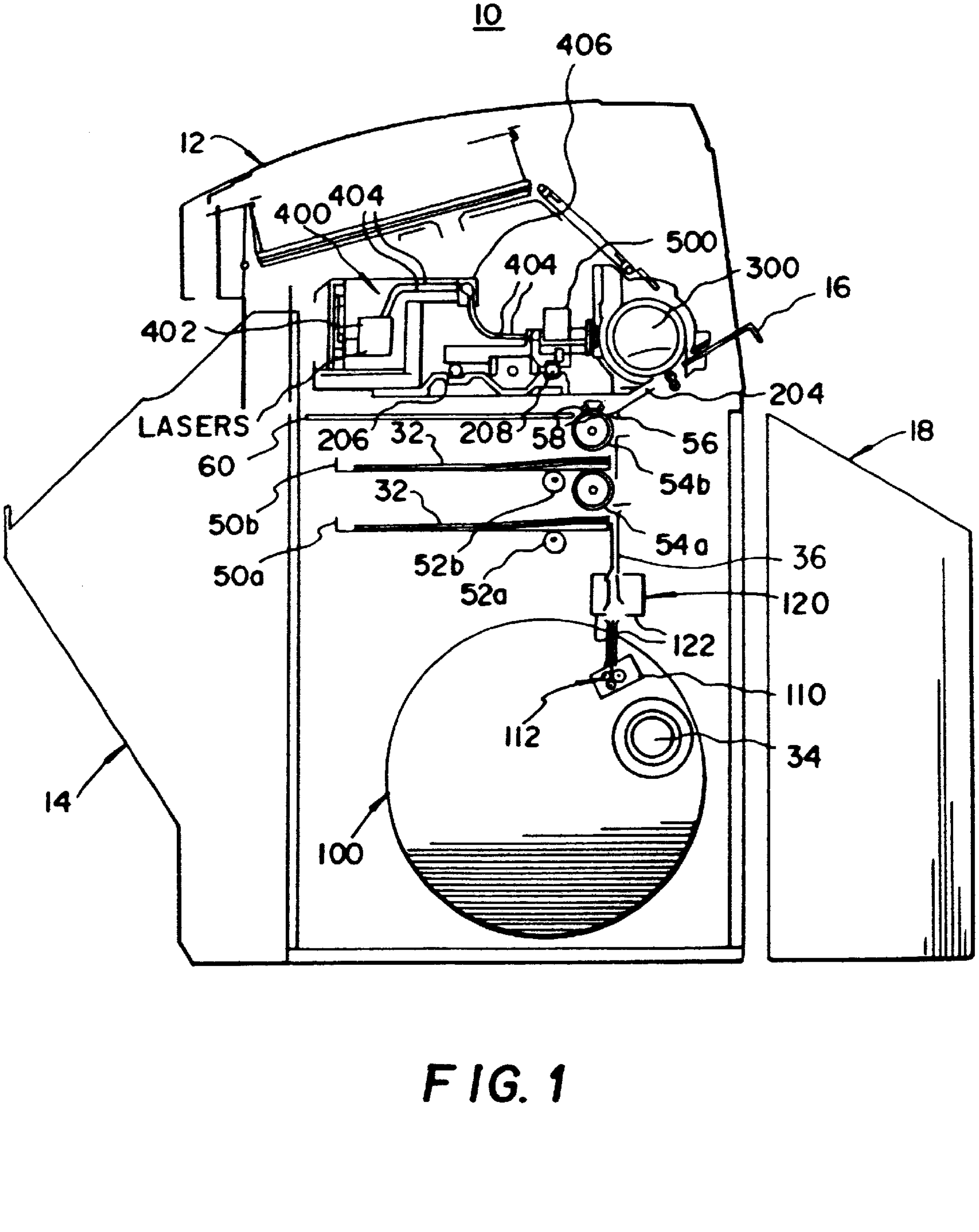
FIG. 1 is a side view in vertical cross section of an image processing apparatus in which the improved lead screw assembly of the present invention may be used.

Referring to FIG. 1, therein is illustrated an image processing apparatus 10 according to the present invention having an image processor housing 12 which provides a protective cover. The hinged image processor door 14 is attached to the front portion of the image processor housing 12 permitting access to two sheet material trays consisting of a lower sheet material tray 50*a* and upper sheet material tray 50*b*. The lower sheet material tray 50*a* and upper sheet material tray 50*b* are positioned in the interior portion of the image processor housing 12 for supporting thermal print media 32, thereon. Only one of the sheet material trays will dispense the thermal print media 32 to create an intended image thereon.

The alternate sheet material tray either holds an alternative type of thermal print media 32 or functions as a back up sheet material tray. In this regard lower sheet material tray 50*a* includes a lower media lift cam 52*a* used to lift the lower sheet material tray 50*a* and ultimately the thermal print media 32, upwardly toward lower media roller 54*a* and upper media roller 54*b* which, when both are rotated, permits the thermal print media 32 to be pulled upwardly towards a media guide 56. The upper sheet material tray 50*b* includes a upper media lift cam 52*b* for lifting the upper sheet material tray 50*b* and ultimately the thermal print media 32 towards the upper media roller 54*b* which directs it towards the media guide 56.

Figure 2:
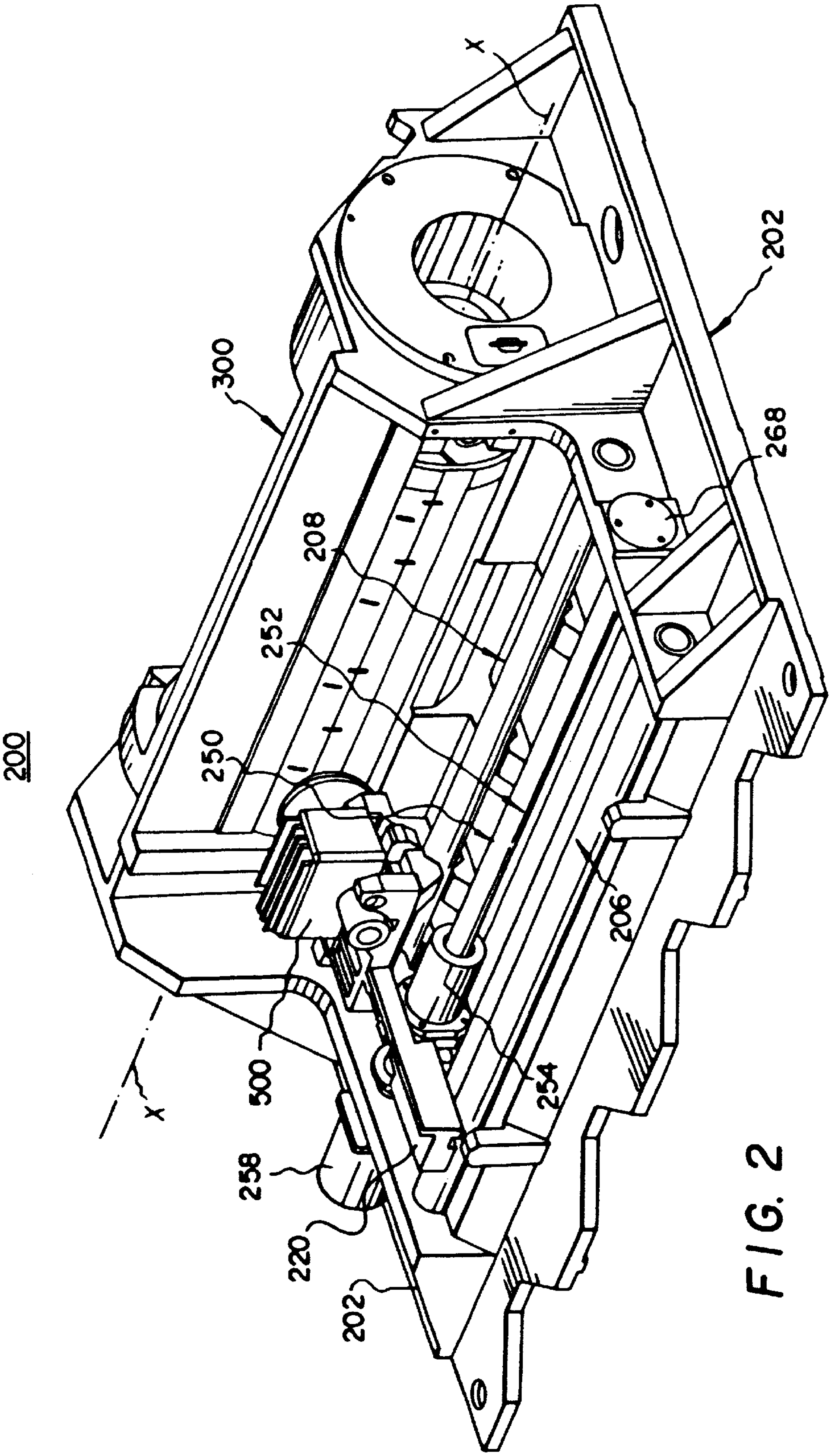
FIG. 2 is perspective view of the lathe bed scanning subsystem or write engine of the present invention.

The movable media guide 56 directs the thermal print media 32 under a pair of media guide rollers 58 which engage the thermal print media 32 for assisting the upper media roller 54*b* in directing it onto the media staging tray 60. The media guide 56 is attached and hinged to the write engine frame (shown in FIG. 2) at one end, and is uninhibited at its other end for permitting multiple positioning of the media guide 56. The media guide 56 then rotates the uninhibited end downwardly, as illustrated in the position shown. The direction of rotation of the upper media roller 54*b* is reversed for moving the thermal print media 32 resting on the media staging tray 60 under the pair of media guide rollers 58, upwardly through an entrance passageway 204 and up to the imaging drum 300.

A roll of dye donor material 34 is connected to the media carousel 100 in a lower portion of the image processor housing 12. Typically, four rolls are used, but only one is shown for clarity. Each roll includes a dye donor material 34 of a different color, typically black, yellow, magenta and cyan, or other colorant. These dye donor materials 34 are ultimately cut into dye donor sheet materials 36 and passed to the imaging drum 300 for forming the medium from which dyes imbedded therein are passed to the thermal print media 32 resting thereon. In this regard, a media drive mechanism 110 is attached to each roll of dye donor material 34, and includes three media drive rollers 112 through which the dye donor material 34 of interest is metered upwardly into a media knife assembly 120. After the dye donor material 34 reaches a predetermined position, the media drive rollers 112 cease driving the dye donor material 34.

The two media knife blades 122 positioned at the bottom portion of the media knife assembly 120 cut the dye donor material 34 into dye donor sheet materials 36. The lower media roller 54*a* and the upper media roller 54*b* along with the media guide 56 then pass the dye donor sheet material 36 onto the media staging tray 60 and ultimately to the imaging drum 300. Once the thermal print media 32 is moved into position, a magnetic load roller (not shown) is moved into contact with thermal print media 32 against the imaging drum 300. The imaging drum 300 has a ferrous coating that attracts the magnetic load roller to it with the magnetic load roller aligning its self to the imaging drum 300. The imaging drum 300 is the rotated counter clock wise with the load roller engaged until the magnetic load roller is at the end of the thermal print media 32.

In operation, the imaging drum 300 is reversed until the load roller is passed the opposite end of the thermal print media 32, and over the embedded magnets (not shown) in the imaging drum 300. The opposing force of the embedded magnets in the imaging drum 300 and roller 350 force the load roller away from the surface of the imaging drum 300. Once the thermal print media 32 is in place the dye donor sheet material 36 is positioned on the imaging drum 300 in registration with the thermal print media 32 using the same process as described above for loading the thermal print media 32 to the imaging drum 300. The dye donor sheet material 36 now rests atop the thermal print media 32 with a narrow gap between the two created by micro-beads imbedded in the surface of the thermal print media 32.

A laser assembly 400 includes a quantity of laser diodes 402 in its interior, the laser diodes 402 are connected via fiber optic cables 404 to a distribution block 406 and ultimately to the printhead 500. The printhead 500 directs thermal energy received from the laser diodes 402 causing the dye donor sheet material 36 to pass the desired color across the gap to the thermal print media 32. As shown more clearly in FIG. 2, the printhead 500 attaches to the lead screw 250. This is done by way of the lead screw drive nut 254 and drive coupling 256 permitting axial movement along the longitudinal axis of the imaging drum 300 for transferring the data to create the intended image onto the thermal print media 32.

For writing, the imaging drum 300 rotates at a constant velocity. The printhead 500 begins at one end of the thermal print media 32 and traverse the entire length of the thermal print media 32 for completing the transfer process for the particular dye donor sheet material 36 resting on the thermal print media 32. After printhead 500 completes the transfer process for a dye donor sheet material 36 resting on the thermal print media 32. The dye donor sheet material 36 is then removed from the imaging drum 300 and transferred out the image processor housing 12 via a skive or ejection chute 16. The dye donor sheet material 36 eventually comes to rest in a waste bin 18 for removal by the user. The above described process is then repeated for the other rolls of dye donor materials 34.

After the color from all four sheets of the dye donor sheet materials 36 have been transferred. The dye donor sheet material 36 is removed from the imaging drum 300. The thermal print media 32 with the intended image thereon is then removed from the imaging drum 300 and transported via a transport mechanism 80 out of the image processor housing 12 and comes to rest against a media stop 20.

Referring again to FIG. 2, therein is illustrated a perspective view of the write engine subsystem 200 of the image processing apparatus 10, including the imaging drum 300, printhead 500 and lead screw 250 mounted in the write engine frame 202. The imaging drum 300 is mounted for rotation about an axis X in the write engine frame 202. The printhead 500 is movable with respect to the imaging drum 300, and is arranged to direct a beam of light to the dye donor sheet material 36. The beam of light from the printhead 500 for each laser diode 402 is modulated individually by modulated electronic signals from the image processing apparatus 10, which are representative of the shape and color of the original image so that the color on the dye donor sheet material 36 is heated to cause volatilization only in those areas in which its presence is required on the thermal print media 32 to reconstruct the shape and color of the original image.

The printhead 500 is mounted on a movable translation stage member 220 which, in turn, is supported for low friction movement on translation bearing rods 206 and 208. The translation bearing rods 206 and 208 are sufficiently rigid so as not sag or distort between mounting points and are arranged as parallel as possible with the axis X of the imaging drum 300 with the axis of the printhead 500 perpendicular to the axis X of the imaging drum 300 axis. The front translation bearing rod 208 locates the translation stage member 220 in the vertical and the horizontal directions with respect to axis X of the imaging drum 300. The rear translation bearing rod 206 locates the translation stage member 220 only with respect to rotation of the translation stage member 220 about the front translation bearing rod 208 so that there is no over-constraint condition of the translation stage member 220, which might cause it to bind, chatter, or otherwise impart undesirable vibration or jitters to the printhead 500 during the generation of an intended image.

Figure 3:
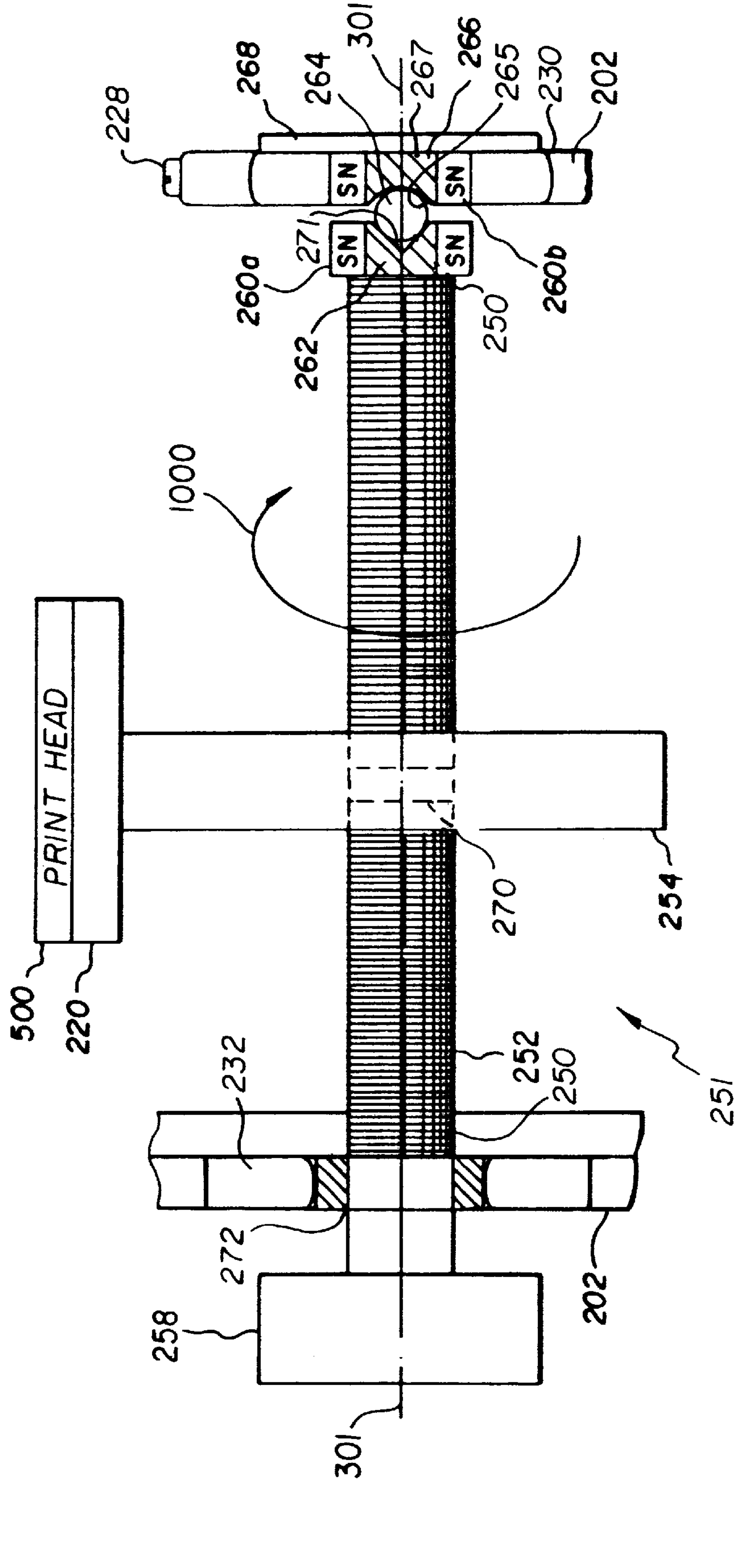
FIG. 3 (PRIOR ART)
FIG. 3 is a top view in horizontal section of a prior art lead screw assembly.

Referring to FIG. 3, a prior art lead screw assembly 251 is shown which includes an elongated, threaded shaft 252 which is attached to the linear drive motor 258 on its drive end and to the write engine frame 202 by means of a radial bearing 272. A lead screw drive nut 254 includes grooves in its hollowed-out center portion 70 for mating with the threads of the threaded shaft 252. Permitting the lead screw drive nut 254 axial movement along the threaded shaft 252 as the threaded shaft 252 is rotated by the linear drive motor 258. The lead screw drive nut 254 is integrally attached to the printhead 500 through the lead screw coupling 256 (not shown) and the translation stage member 220 at its periphery such that as the threaded shaft 252 is rotated by the linear drive motor 258 moving the lead screw drive nut 254 axially along the threaded shaft 252 which, in tun, moves the translation stage member 220 and ultimately the printhead 500 axially along the imaging drum 300.

As illustrated in FIG. 3, an annular-shaped axial load magnet 260*a* is integrally attached to the driven end of the threaded shaft 252, and is in a spaced apart relationship with another annular-shaped axial load magnet 260*b* attached to the write engine frame 202. The axial load magnets 260*a* and 260*b* are preferably made of rare-earth materials such as neodymium-iron-boron.

A generally circular-shaped boss 262 forms part of the threaded shaft 252 and rests in the hollowed-out portion of the annular-shaped axial load magnet 260*a*, and includes a generally V-shaped surface 271 which forms a mounting socket for receiving a ball bearing 264. A circular-shaped insert 266 is placed in the hollowed-out portion of the other annular-shaped axial load magnet 260*b*. As shown, the insert 266 includes a circular-shaped surface 265 which forms a bearing socket at one end of the assembly 251 for receiving ball bearing 264, and a flat surface 267 at its other end for receiving an end cap 268 placed over the annular-shaped axial load magnet 260*b*, which is attached to the lathe bed-scanning frame 202 for protectively covering the annular-shaped axial load magnet 260*b* and providing an axial stop for the lead screw 250. The circular shaped insert 266 is preferably made of material such as Rulon J or Delrin AF, both well known in the art.

The lead screw assembly 251 operates as follows. The linear drive motor 258 is energized and imparts rotation to the lead screw 250, as indicated by the arrow 1000, causing the lead screw drive nut 254 to move axially along the threaded shaft 252. The annular-shaped axial load magnets 260*a* and 260*b* are magnetically attracted to each other, which prevents axial movement of the lead screw 250. The ball bearing 264, however, permits rotation of the lead screw 250 while maintaining the positional relationship of the annular-shaped axial load magnets 260, i.e., slightly spaced apart, which prevents mechanical friction between them while obviously permitting the threaded shaft 252 to rotate.

A problem associated with prior art lead screw assemblies, such as lead screw assembly 251, is the tolerance between the lead screw, such as lead screw 252 and the sockets in which the ball, such as ball bearing 264, fits. An increased tolerance between the end of the lead screw and the socket could result in the ball releasing from the socket. Alternatively, the epoxy holding the ball in the socket can stick on the ball causing interference with the bearing socket. This may lead to unwanted axial lateral shifting or movement of the lead screw assembly. Other problems include improper seating or loss of the bond holding the lead screw within the socket. The present invention provides an improved lead screw assembly that eliminates these problems and is suitable for use in any imaging application where a lead screw is used for printhead positioning.

Figure 4:
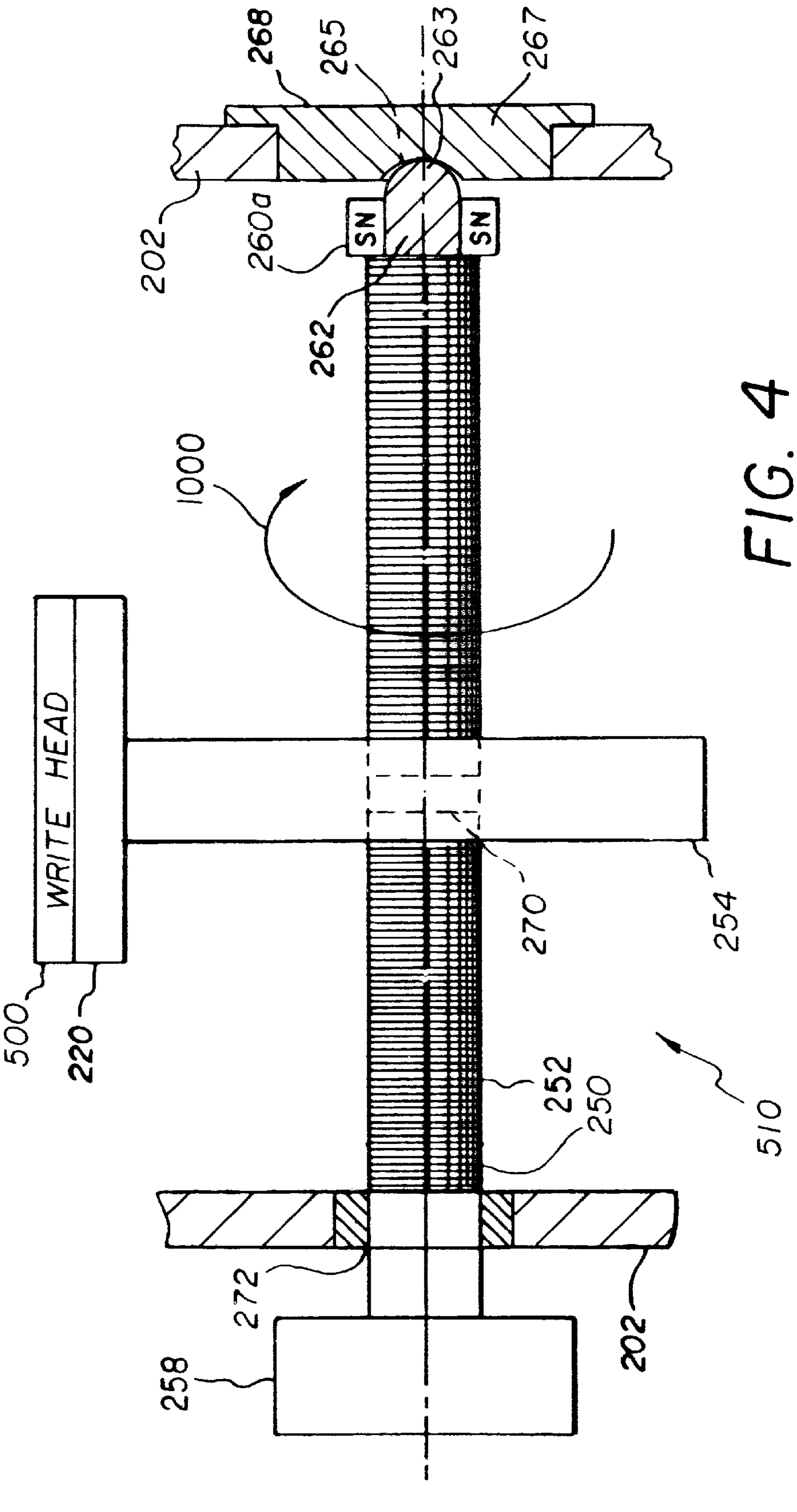
FIG. 4 is a top view in horizontal section of the lead screw assembly according to the present invention.

Turning to FIG. 4, therein is shown the improved lead screw assembly, denoted generally as 510, of the invention. In particular, the improved lead screw assembly 510 has an annular-shaped axial load magnet 260*a* integrally attached to the driven end of the threaded shaft 252, which provides a first member coupled to the ball shaped boss 262 and is in a spaced apart relationship with end cap 268 attached to the write engine frame 202. The axial load magnet 260*a* is preferably made of rare-earth materials such as neodymium-iron-boron. The generally circular-shaped boss 262 is part of the threaded shaft 252 and rests in the hollowed-out portion of the annular-shaped axial load magnet 260*a*, and includes a ball end 263 for receiving end cap 268. The end cap 268 provides a second member that couples to the boss 262 and includes a circular shaped surface 265 for receiving ball end 263 of the boss 262, and a flat surface 267 at its other end, which is attached to the write engine frame 202. In this way, the end cap 268 provides an axial stop for the lead screw 250.

The lead screw assembly 251 operates as follows. The linear drive motor 258 is energized and imparts rotation to the lead screw 250, as indicated by the arrow 1000, causing the lead screw drive nut 254 to move axially along the threaded shaft 252. The annular-shaped axial load magnet 260*a* is magnetically attracted to end cap 268, which prevents axial movement of the lead screw 250. The ball end 263, however, permits rotation of the lead screw 250 while maintaining the positional relationship of the annular-shaped axial load magnet 260 slightly spaced apart from end cap 268, which prevents mechanical friction between them while obviously permitting the threaded shaft 252 to rotate.

Therefore, the ball end 263 of the lead screw 250 is maintained within the socket provided by the circular surface 265 of end cap 268 that eliminates shifting or motion of the lead screw 250 as it rotates. The circular surface 265 can be coated with a bearing material, such as Rulon J or Delrin AF, to create a magnetic attraction between the end cap 268 and the ball end 263. The ball end can be made of Nickel Teflon or other similar material and the lead screw assembly 510 is pre-loaded into the socket formed by circular-shaped surface 265. The lead screw 250 may be furnished with a lubricant, such as Nickel Teflon, that has a low coefficient of friction, thereby facilitating loading of the lead screw assembly 510 and rotation of the lead screw 250. In this way, the lead screw assembly 510 maintains a substantially uniform tolerance during positioning of the printhead 500 with less shifting or motion of the lead screw 250 and improved performance.

The invention has been described with reference to the preferred embodiments thereof. It will be appreciated and understood that variations and modifications can be effected within the scope of the invention as described herein above and as defined in the appended claims by a person of ordinary skill in the. In general, the invention is applicable to any imaging apparatus that uses a lead screw for printhead positioning.

PARTS LIST

10. Image processing apparatus
12. Image processor housing
16. Ejection chute
18. Waste bin
20. Media stop
32. Thermal print media
34. Dye donor material
36. Dye donor sheet materials
50*a*. Material tray
50*b*. Material tray
52. Media lift cam
54*b*. Media roller
56. Media guide
58. Media guide rollers
60. Media staging tray
70. Center portion
80. Transport mechanism
100. Media carousel
110. Media drive mechanism
112. Media drive rollers
120. Media knife assembly
122. Media knife blades
200. Write engine subsystem
202. Write engine frame
204. Entrance passageway
206. Translation bearing rod
208. Translation bearing rod
220. Translation stage member
250. Lead screw
251. Lead screw assembly
252. Threaded shaft
254. Lead screw drive nut
256. Coupling
258. Linear drive motor
260*a*. Axial load magnet
260*b*. Axial load magnet
262. Boss
263. Ball end
264. Ball bearing
265. Circular-shaped surface
266. Insert
267. Flat surface
268. End cap
271. V-shaped surface
272. Radial bearing
300. Imaging drum
350. Roller
400. Laser assembly
402. Laser diodes
404. Fiber optic cables
406. Distribution block
500. Printhead
510. Improved lead screw assembly
1000. Arrow

What is claimed is:

1. A lead screw assembly for positioning a printhead comprising:

a threaded shaft having a ball end;

a first member coupled to said ball end;

a second member magnetically attracted to said first member and spaced apart from said first member so as to prevent mechanical friction between said first and second member;

wherein said first and second members prevent substantial movement of said threaded shaft while it rotates; and wherein said first member further comprises a magnet insertably attached to said ball end such that said ball end is annularly surrounded by said first member.

2. The apparatus of claim 1 further comprising a write engine frame adapted for housing said threaded shaft such that said shaft is firmly secured as it rotates.

3. The apparatus of claim 2 further comprising a motor mounted on said engine frame and having an output shaft attached to end of said threaded shaft opposite said ball end, said motor adapted for rotating said threaded shaft.

4. The apparatus of claim 1 wherein said second member further comprises an end cap attached to said frame, said cap adapted for providing an axial-stop for said lead screw.

5. The apparatus of claim 4 wherein said end cap further comprises:

a flat surface; and a circular surface opposite said flat surface and adapted for receiving said ball end of said shaft so as to substantially diminish the axial movement of said shaft as it rotates.

6. The apparatus of claim 1 wherein said ball end further comprises Nickel Teflon.

7. The apparatus of claim 1 wherein said first member is a ferromagnetic member.

8. A writing engine system having an improved lead screw for improving an image generating process, said system comprising:

a printhead;

a lead screw nut coupled to said printhead;

a threaded lead shaft having a ball end, said threaded lead shaft insertably coupled to said lead screw nut and adapted to rotate so as to cause said screw nut to move axially along said shaft;

a first member coupled to said ball end of said threaded lead shaft, wherein said first member is a magnet insertably attached to said ball end such that said ball end is annularly surrounded by said first member; and wherein said printhead is substantially stabilized as said nut moves axially along said shaft while said printhead generates an image.

9. The system of claim 8 further comprising a write engine frame adapted for housing said threaded shaft such that said shaft is firmly secured as it rotates.

10. The system of claim 9 further comprising a motor mounted on said engine frame and having an output shaft attached to the opposite end of said threaded shaft, said motor adapted for rotating said threaded shaft.

11. The system of claim 8 wherein said threaded shaft further comprises:

said ball end;

a first member insertably attached to said ball end; and a second member magnetically attracted to said first member and spaced apart from said first member so as to prevent mechanical friction between said first and second members while said shaft rotates.

12. The system of claim 11 wherein said ball end comprises Nickel Teflon.

13. The system of claim 11 wherein said first member is a ferromagnetic member.

14. The system of claim 8 wherein a second member further comprises an end cap attached to a write engine frame and adapted for providing an axial stop for said threaded shaft.

15. The system of claim 14 wherein said end cap further comprises:

a circular flat surface; and a circular surface opposite said flat surface, and adapted for receiving said ball end of said shaft so as to substantially diminish the axial movement of said shaft as it rotates.

* * * * *